US008856935B2

(12) United States Patent
Kalman et al.

(10) Patent No.: US 8,856,935 B2
(45) Date of Patent: *Oct. 7, 2014

(54) AUTOMATIC SYNTHESIS OF UNIT TESTS FOR SECURITY TESTING

(75) Inventors: Daniel Kalman, Herzliya (IL); Ory Segal, Herzliya (IL); Omer Tripp, Herzliya (IL); Omri Weisman, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/367,633

(22) Filed: Feb. 7, 2012

(65) Prior Publication Data
US 2013/0205398 A1 Aug. 8, 2013

(51) Int. Cl.
*H04L 29/06* (2006.01)
*G06F 21/00* (2013.01)

(52) U.S. Cl.
CPC .................................. *H04L 63/1433* (2013.01)
USPC ........................................................... 726/25

(58) Field of Classification Search
None
See application file for complete search history.

(56) References Cited

U.S. PATENT DOCUMENTS

| | | | |
|---|---|---|---|
| 7,877,780 B2 | 1/2011 | Kolawa et al. | |
| 2004/0010776 A1 | 1/2004 | Shah | |
| 2005/0273860 A1 | 12/2005 | Chess et al. | |
| 2006/0195588 A1* | 8/2006 | Pennington et al. | 709/227 |
| 2008/0005723 A1 | 1/2008 | Zimmerer | |
| 2008/0115114 A1 | 5/2008 | Palaparthi et al. | |
| 2010/0050263 A1* | 2/2010 | Weisman | 726/25 |
| 2010/0083240 A1 | 4/2010 | Siman | |
| 2011/0030061 A1* | 2/2011 | Artzi et al. | 726/25 |
| 2011/0131656 A1 | 6/2011 | Haviv et al. | |
| 2012/0042383 A1* | 2/2012 | Greene et al. | 726/25 |
| 2013/0205399 A1 | 8/2013 | Kalman et al. | |

FOREIGN PATENT DOCUMENTS

| | | |
|---|---|---|
| CN | 102136047 A | 7/2011 |
| WO | 2013118006 A1 | 8/2013 |

OTHER PUBLICATIONS

Endo-Testing: Unit Testing with Mock Objects, Tim MacKinnon (Connextra), Steve Freeman (BBST), Philip Craig (Independent), "eXtreme Programming and Flexible Processes in Software Engineering—XP2000" conference, published in XP eXamined by Addison-Wesley, 2001.*

(Continued)

*Primary Examiner* — Gilberto Barron, Jr.
*Assistant Examiner* — Malcolm Cribbs
(74) *Attorney, Agent, or Firm* — Cuenot, Forsythe & Kim, LLC

(57) ABSTRACT

Performing security analysis on a computer program under test (CPUT). The CPUT can be analyzed to identify data pertinent to potential security vulnerabilities of the CPUT. At least a first unit test configured to test a particular unit of program code within the CPUT can be automatically synthesized. The first unit test can be configured to initialize at least one parameter used by the particular unit of program code within the CPUT, and can be provided at least a first test payload configured to exploit at least one potential security vulnerability of the CPUT. The first unit test can be dynamically processed to communicate the first test payload to the particular unit of program code within the CPUT. Whether the first test payload exploits an actual security vulnerability of the CPUT can be determined, and a security analysis report can be output.

13 Claims, 3 Drawing Sheets

(56) References Cited

OTHER PUBLICATIONS

Haack, P., "Unit Testing Security Example," [online] Haacked.com, Sep. 20, 2007 [retrieved Feb. 7, 2012] retrieved from the Internet: <http://haacked.com/archive/2007/09/21/unit-testing-security-example.aspx>, 4 pgs.

Mudivarti, P., "Spring Security 3 Unit Testing Example with DbUnit," [online] Revert to Console, Aug. 18, 2010 [retrieved Feb. 7, 2012] retrieved from the Internet: <http://www.reverttoconsole.com/blog/spring/spring-security-3-unit- testing-example-with-dbunit/>, 4 pgs.

"Rational AppScan Family," [onine] IBM Software, [retrieved Feb. 7, 2012] retrieved from the Internet: <http://www-01.ibm.com/software/awdtools/appscan/>, 2 pgs.

Tripp, O., et al., "TAJ: Effective Taint Analysis of Web Applications," [online] ACM Digital Library, Proc. of 2009 ACM SIGPLAN Conf. on Programming Language Design and Implementation, 2009 [retrieved Feb. 7, 2012] retrieved from the Internet: <www.cs.tau.ac.il/~-omertrip/pldi09/paper.pdf>, 11 pgs.

"jMock," [online] jMock.org, [retrieved Feb. 7, 2012] retrieved from the Internet: <http://www.jmock.org/>, 1 pg.

"NMock: A Dynamic Mock Object Library for .NET," [online] NMock.org, Jan. 30, 2008 [retrieved Feb. 7, 2012] retrieved from the Internet: <http://www.nmock.org/>, 1 pg.

"Jakarta Cactus—EJB Testing with J2EE RI," [online] The Apache Jakarta Project, Jan. 18, 2009 [retrieved Feb. 7, 2012] retrieved from the Internet: <http://jakarta.apache.org/cactus/writing/howto_ejb_j2eeri.html>, 5 pgs.

Penumudi, S., "Testing Web Applicaiton Using Spring Mock," Big Moose Saloon, CodeRanch.com, Aug. 25, 2010 [retrieved Feb. 7, 2012] retrieved from the Internet: <http://www.coderanch.com/t/507976/Testing/Testing-web-application-Spring-Mock>, 2 pgs.

Arkin, B., et al., "Software Penetration Testing,", IEEE Security & Privacy, Jan.-Feb. 2005, 4 pgs.

Curphey, M., et al, "Web Application Security Assessment Tools," IEEE Security & Privacy, Jul.-Aug, 2006, 10 pgs.

Bjorner, N., et al., "Z2310: Applications, Enablers, Challenges and Directions," In Proc. of 6th Int'l. Workshop on Constraints in Formal Verification, CFV '09, 2009, 15 pgs.

WIPO Application No. PCT/IB2013/050432, International Search Report, Jun. 20, 2013, 2 pg.

\* cited by examiner

300

```
┌─────────────────────────────────┐
│ Via a processor, analyze the CPUT│
│ to identify data pertinent to   │
│ potential security              │
│ vulnerabilities of the CPUT     │
│                             302 │
└─────────────────────────────────┘
            │
            ▼
┌─────────────────────────────────┐
│ Automatically synthesize at     │
│ least one unit test, each unit  │
│ test configured to initialize   │
│ one or more parameters consumed │
│ by a particular unit of CPUT    │
│ program code, and provide to    │
│ each test unit one or more test │
│ payloads configured to test the │
│ CPUT for one or more potential  │
│ security vulnerabilities of the │
│ CPUT                        304 │
└─────────────────────────────────┘
            │
            ▼
┌─────────────────────────────────┐
│ Dynamically process the unit    │
│ test(s) to communicate the test │
│ payload(s) to the CPUT          │
│                             306 │
└─────────────────────────────────┘
            │
            ▼
┌─────────────────────────────────┐
│ Receive from the CPUT one or    │
│ more HTTP responses             │
│                             308 │
└─────────────────────────────────┘
            │
            ▼
┌─────────────────────────────────┐
│ Determine whether the test      │
│ payload(s) exploit actual       │
│ security vulnerabilities of the │
│ CPUT                        310 │
└─────────────────────────────────┘
            │
            ▼
┌─────────────────────────────────┐
│ Analyze the HTTP response(s) to │
│ determine whether additional    │
│ potential security              │
│ vulnerabilities of the CPUT     │
│ exist                       312 │
└─────────────────────────────────┘
            │
            ▼
         ◇ Additional
        potential security
        vulnerabilities?
              314
            │
            ▼
┌─────────────────────────────────┐
│ Identify additional data        │
│ pertinent to potential security │
│ vulnerabilities of the CPUT     │
│                             316 │
└─────────────────────────────────┘
            │
            ▼
┌─────────────────────────────────┐
│ Automatically synthesize at one │
│ additional unit test, and       │
│ provide to the additional unit  │
│ test(s) at least one other test │
│ payload configured to test the  │
│ CPUT for at least one potential │
│ security vulnerability of the   │
│ CPUT                        318 │
└─────────────────────────────────┘
            │
            ▼
┌─────────────────────────────────┐
│ Output a security analysis      │
│ report indicating whether the   │
│ test payload(s) exploit(s)      │
│ actual security vulnerabilities │
│ of the CPUT                 320 │
└─────────────────────────────────┘
```

FIG. 3

AUTOMATIC SYNTHESIS OF UNIT TESTS FOR SECURITY TESTING

BACKGROUND

One or more embodiments disclosed within this specification relate to security testing of software.

Unit testing oftentimes is used to ensure compliance of a software unit with its functional specification. Unit testing is a method by which individual units of program code are tested to determine whether they properly function and behave as intended. Generally speaking, a unit is the smallest testable part of an application. In procedural programming, a unit can be an entire module, but is more commonly an individual function or procedure. In object-oriented programming a unit is often an entire interface, such as a class, but also can be an individual method. Unit tests typically are written and executed by software developers. Its implementation can vary from being a very manual operation to being formalized as part of build automation.

BRIEF SUMMARY

One or more embodiments disclosed within this specification relate to performing security analysis on a computer program under test (CPUT).

An embodiment can include, via a processor, analyzing the CPUT to identify data pertinent to potential security vulnerabilities of the CPUT. The method further can include automatically synthesizing at least a first unit test configured to test a particular unit of program code within the CPUT, the first unit test configured to initialize at least one parameter used by the particular unit of program code within the CPUT. The method also can include providing to the first unit test at least a first test payload configured to exploit at least one potential security vulnerability of the CPUT. The method further can include dynamically processing the first unit test to communicate the first test payload to the particular unit of program code within the CPUT, determining whether the first test payload exploits an actual security vulnerability of the CPUT, and outputting a security analysis report indicating whether the first test payload exploits an actual security vulnerability of the CPUT.

Another embodiment can include, via a processor, performing a static analysis of the CPUT to identify data pertinent to potential security vulnerabilities of the CPUT. The method further can include automatically synthesizing at least a first unit test configured to test a particular unit of program code within the CPUT, the first unit test configured to initialize at least one parameter used by the particular unit of program code within the CPUT. The method also can include providing to the first unit test at least a first test payload configured to exploit at least one potential security vulnerability of the CPUT, dynamically processing the first unit test to communicate the first test payload to the particular unit of program code within the CPUT via an Hypertext Transfer Protocol (HTTP) request, determining whether the first test payload exploits an actual security vulnerability of the CPUT, and outputting a security analysis report indicating whether the first test payload exploits an actual security vulnerability of the CPUT.

Another embodiment can include a computer program product for performing security analysis on a computer program under test (CPUT). The computer program product can include a computer-readable storage medium having computer-readable program code embodied therewith, the computer-readable program code comprising computer-readable program code configured to perform the various operations and/or functions disclosed within this specification.

Another embodiment can include a system can include a processor configured to perform operations/executable operations/etc., as described within this specification.

BRIEF DESCRIPTION OF THE SEVERAL VIEWS OF THE DRAWINGS

FIG. 3 is a flow chart illustrating a method of performing security analysis on a CPUT in accordance with another embodiment disclosed within this specification.

DETAILED DESCRIPTION

Figure 1:
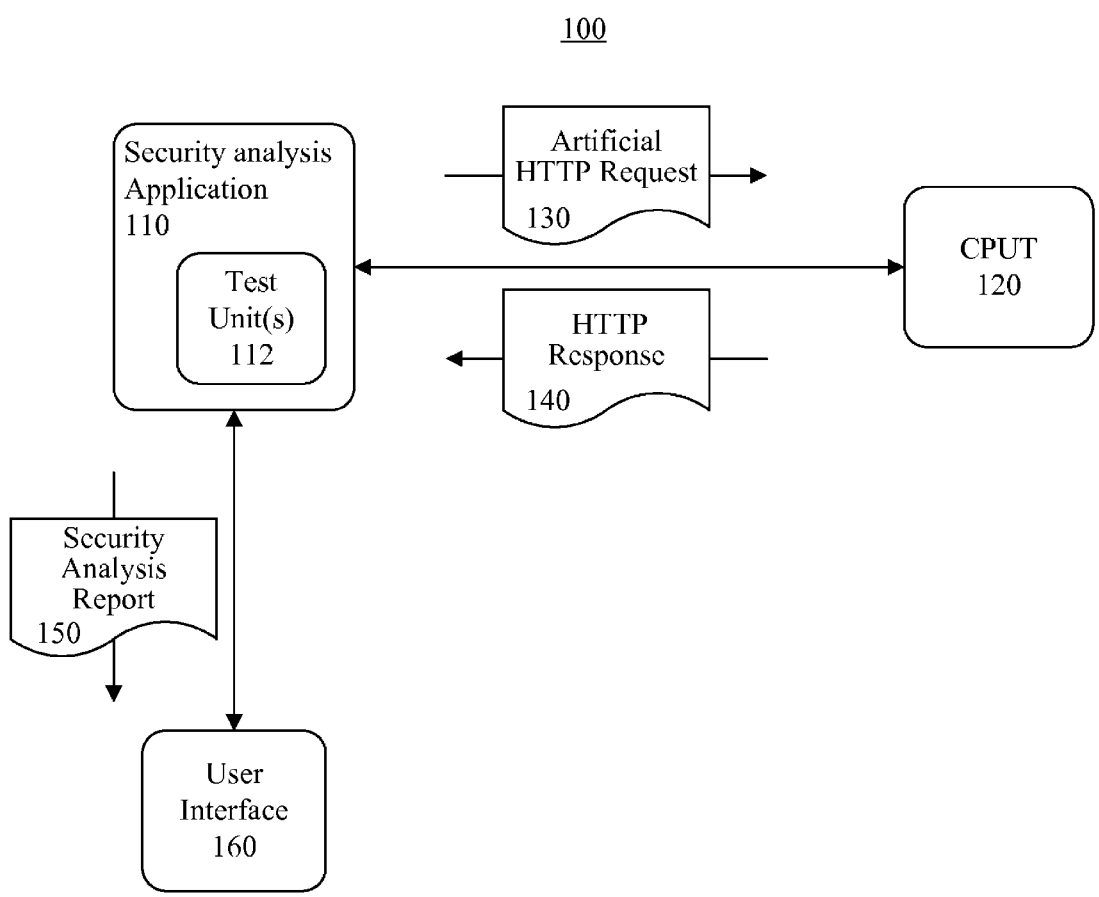
FIG. 1 is a block diagram illustrating a system for automatically synthesizing unit tests for security testing in accordance with one embodiment disclosed within this specification.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The arrangements described herein relate to security analysis and testing a computer program under test (CPUT), such as a web based application. More particularly, data related to the CPUT can be extracted and processed to dynamically create unit tests specifically configured to test for security vulnerabilities that may be present in the CPUT. The unit tests can be automatically synthesized based on the data retrieved for the CPUT's program code. Accordingly, the unit tests that are automatically created can be CPUT specific, and can exercise the CPUT to determine security vulnerabilities. Specifically, the CPUT's entry points can be identified and, for each entry point, Hypertext Transfer Protocol (HTTP) parameters corresponding to the entry point can be determined. These entry points can be exercised using one or more unit tests to inject test data, for example payloads containing malicious program code, values or the like to one or more parameters consumed by the CPUT's entry points. Accordingly, the unit tests can be used to test the CPUT to determine whether the CPUT is vulnerable to malicious data that potentially may be injected by an end user when the CPUT is live (i.e., deployed and operating in its intended manner).

As used herein, a unit test is computer-readable program code that performs testing on a particular unit of CPUT program code (e.g., a smallest testable part of the CPUT), and initializes at least one parameter used by the particular unit. Examples of program code include, but are not limited to, source code, bytecode (i.e., portable code or p-code), binary code, and the like. One or more payloads, such as program code (e.g., script), values or the like, may be provided to a unit test to be injected in the CPUT for security testing. As used herein, a unit of the CPUT is a function, a module, or any other group of one or more lines of the CPUT program code that perform a particular operation. Hereinafter, within the description and/or claims that follow, a unit of the CPUT may be referred to as a "unit of program code."

FIG. 1 is a block diagram illustrating a system 100 for automatically synthesizing unit tests 112 for security testing in accordance with one embodiment disclosed within this specification. The system can include a security analysis application 110 and a CPUT 120 that is tested for security vulnerabilities by the security analysis application 110.

In one embodiment, the security analysis application 110 and a CPUT 120 can be executed on the same processing system. Accordingly, the cost of communications bandwidth for the security analysis application 110 and the CPUT 120 can be eliminated. In illustration, communication latency can be minimized and overhead processes required to support communications between disparate systems can be negated.

In operation, the security analysis application 110 can analyze the CPUT 120 to identify data pertinent to potential security vulnerabilities of the CPUT 120. For example, the security analysis application 110 can retrieve the program code for the CPUT 120 and perform a static analysis of the program code to identify and extract raw data related to units of the CPUT 120 that receive user inputs and the manner in which such user inputs are manipulated. For example, the security analysis application 110 can identify program code for statements in the CPUT that read a user input into the CPUT 120, and program code for units of the CPUT related to processing data received from users at those entry points.

In an arrangement in which the CPUT 120 is a web application, the security analysis application 110 can analyze and retrieve program code for each unit of the CPUT (i.e., unit of program code) related to receiving HTTP requests and program code for each unit of the CPUT related to processing such HTTP requests. In other words, in addition to analyzing the program code related to providing an interface for user interaction with the CPUT 120, the security analysis application 110 can perform a static analysis on program code related to back end processing performed by the CPUT 120. Accordingly, the static analysis performed by the security analysis application 110 can be very thorough and identify potential security vulnerabilities that may otherwise be missed if only dynamic analysis were used. Moreover, the present embodiments can negate the use of highly expensive HTTP communications by synthesizing unit tests at the server side.

Based on such identifications, the security analysis application 110 can dynamically synthesize unit tests 112 that attempt to exploit security vulnerabilities that potentially may be present in one or more units of the CPUT 120. More particularly, each unit test 112 can be configured to initialize one or more parameters consumed by a particular unit of the CPUT 120.

In an embodiment in which the unit tests 112 generate artificial HTTP requests 130, the security analysis application 110 can implement a mocking framework that provides support for the security analysis application 110 to synthesize the unit tests 112 that generate artificial HTTP requests 130. Such mocking frameworks are known in the art. In illustration, rather than using a conventional user interface provided by the CPUT 120 through which end users interact with the CPUT 120, the mocking framework can include a synthetic class that implements a mock object that properly structures HTTP requests generated by the unit test(s) 112 for consumption by the CPUT 120. In this regard, the mocking framework can mimic the manner in which a conventional user interface receives parameters from a user and generates conventional HTTP requests. The process of mimicking the operation of a convention user interface is oftentimes referred in the art as "mocking."

Further, one or more test payloads can be provided to each unit test 112, which the unit test 112 can communicate to (e.g., inject into) the CPUT, and which may cause a target unit of the CPUT 120 to execute in an undesired manner when the test payloads are received and processed by the CPUT 120. The security analysis application 110 can create the test payloads in any suitable manner. For example, the security analysis application 110 can access a library of test payload values that may correspond to various parameters identified during the static analysis that are consumed by the CPUT 120. As such, the payloads can be predefined, though the invention is not limited in this regard. For example, a user can select which payloads to run or the payloads can be dynamically adapted based on the analysis of the CPUT program code.

By way of example, assume a unit of the CPUT 120 is configured to consume a parameter "name" provided by an end user, for example using a "get name" instruction in the program code of the CPUT 120. Because the parameter "name" is provided by the end user, for example using a HTTP request, it may be considered to be an untrusted parameter; certain unscrupulous end users may attempt to inject malicious payloads into the CPUT 120 using this parameter. The security analysis application 110 can, based on the static analysis, identify that such untrusted parameter is used by a unit of the CPUT 120, and synthesize the unit test 112 to define the parameter "name" and initialize this parameter. Further, the security analysis application 110 can provide to the unit test 112 a test payload to be communicated to the CPUT 120 as the "name" parameter. An example of the payload can be, for instance, a script tag (e.g., "<script type='text/javascript'name='name'>'alert'</script>"). As such, the test payload can be configured to be consumed by the CPUT 120 in order to perform a particular test on the "get name" instruction in the unit of the CPUT 120 being tested. Nonetheless, the invention is not limited to this specific example. For example, a test payload can contain any other program code, value(s), or the like configured to test the CPUT for security vulnerabilities.

The security analysis application 110 can process the unit test(s) 112 to communicate the test payload(s) to the CPUT 120. For example, in one embodiment, a unit test 112 can be processed to generate one or more artificial HTTP requests 130 and communicate the artificial HTTP requests 130 to the CPUT 120. Each artificial HTTP request 130 can include one or more test payloads. As used herein, an artificial HTTP request is an HTTP request that is automatically generated for purposes of testing a CPUT, and not directly generated by a user.

In response to receiving the artificial HTTP request 130, as well as any test payloads contained in, or otherwise associated with, the artificial HTTP request 130, the CPUT 120 can generate a HTTP response 140. The security analysis application 110 can analyze the HTTP response 140 to determine whether the CPUT 120 responds to the artificial HTTP request 130 in an undesirable manner. Moreover, the security analysis application 110 also can monitor other processes executed by the CPUT 120 to determine whether the CPUT 120 responds in an undesirable manner. For example, the security analysis application 110 can implement validation logic to monitor data input/output activity performed by the CPUT 120, for example sending additional artificial HTTP requests, generating data, storing data, retrieving data, and the like.

In one arrangement, the security analysis application 110 can process the HTTP response 140 to identify additional data pertinent to potential security vulnerabilities of the CPUT, such as additional security vulnerabilities in the CPUT or additional aspects of a particular vulnerability that has been identified. Based on such identifications, the security analysis application 110 can dynamically synthesize one or more subsequent unit tests 112 that attempt to exploit security vulnerabilities that potentially may be present in the CPUT 120. In illustration, the security analysis application 110 can synthesize one or more other unit tests 112 comprising other test payload(s) configured to test the CPUT for potential security vulnerabilities, and dynamically execute the other unit test(s) 112 to communicate another test payload (s) to the CPUT 120 via one or more other artificial HTTP requests, for example as previously described. The security analysis application 110 can receive subsequent HTTP responses and/or monitor the CPUT 120 as previously described to determine whether the CPUT 120 responds in an undesirable manner to the subsequent unit test(s) 112.

The security analysis application 110 can analyze the HTTP response 140, any other responses received from the CPUT 120, and/or data input/output activity performed by the CPUT 120 to identify security vulnerabilities in the CPUT 120. Based on such analysis, the security analysis application 110 can generate a security analysis report 150 indicating security vulnerabilities related to the CPUT 120. In illustration, the security analysis application 110 can output the security analysis report 150 to a user interface 160, a computer-readable storage device, or the like. The user interface 160 can be presented by the processing system on which the security analysis application 110 is executed, but this need not be the case.

Figure 2:
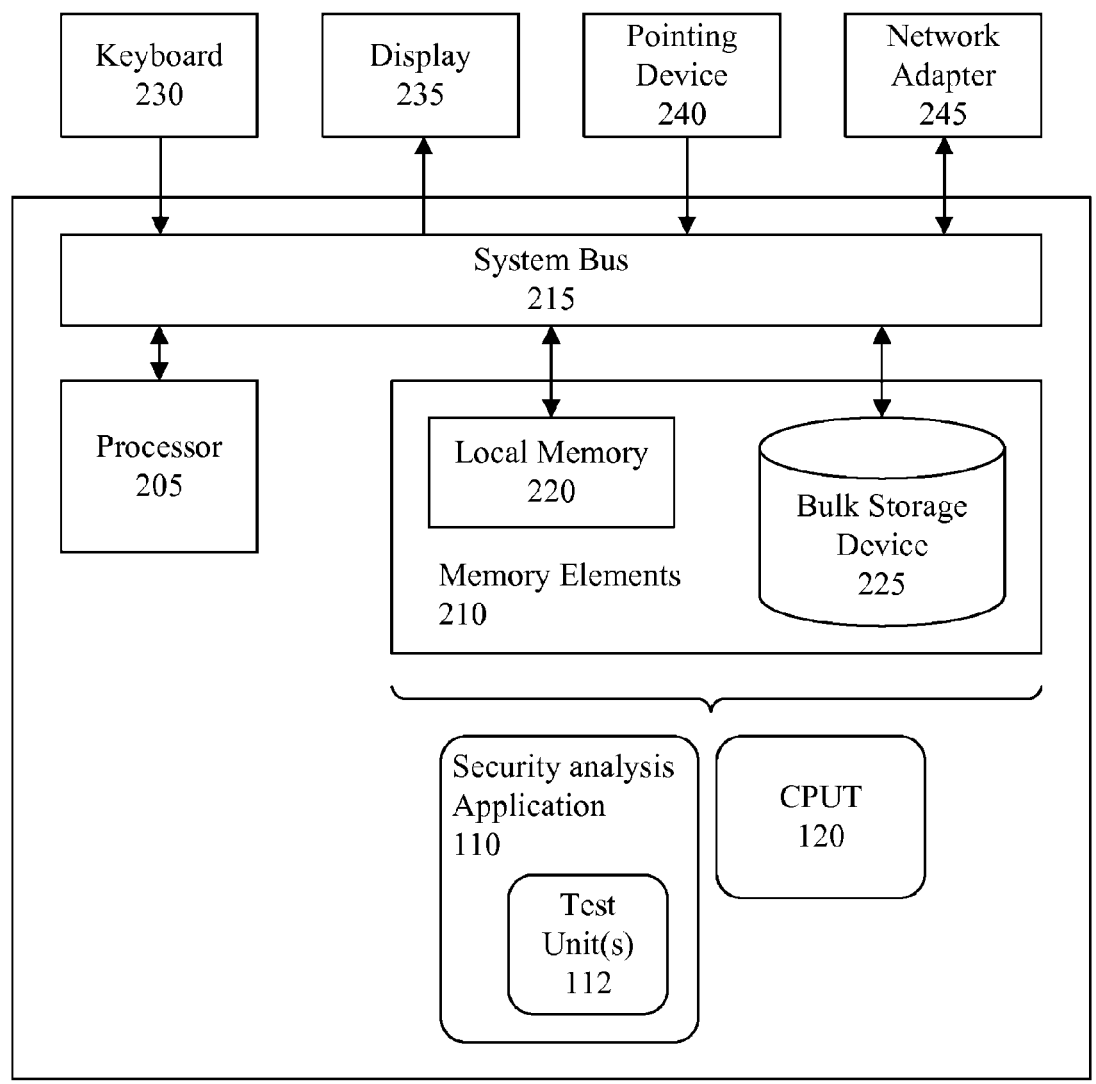
FIG. 2 is a block diagram illustrating a processing system in accordance with one embodiment disclosed within this specification.

FIG. 2 is a block diagram illustrating a processing system 200 in accordance with one embodiment disclosed within this specification. The processing system 200 can include at least one processor 205 coupled to memory elements 210 through a system bus 215 or other suitable circuitry. As such, the processing system 200 can store computer-readable program code within memory elements 210. The processor 105 can execute the computer-readable program code accessed from the memory elements 210 via the system bus 215. In one aspect, for example, the processing system 200 can be implemented as computer that is suitable for storing and/or executing program code. It should be appreciated, however, that the processing system 200 can be implemented in the form of any system including a processor and memory that is capable of performing the functions and/or operations described within this specification.

The memory elements 210 can include one or more physical memory devices such as, for example, local memory 220 and one or more bulk storage devices 225. Local memory 220 refers to random access memory or other non-persistent memory device(s) generally used during actual execution of the program code. The bulk storage device(s) 225 can be implemented as a hard disk drive (HDD), solid state drive (SSD) or other persistent data storage device. The processing system 200 also can include one or more cache memories (not shown) that provide temporary storage of at least some program code in order to reduce the number of times program code must be retrieved from the bulk storage device 225 during execution.

Input/output (I/O) devices such as a keyboard 230, a display 235, and a pointing device 240 optionally can be coupled to the processing system 200. The I/O devices can be coupled to the processing system 200 either directly or through intervening I/O controllers. One or more network adapters 245 also can be coupled to the processing system 200 to enable the processing system 200 to become coupled to other systems, computer systems, remote printers, and/or remote storage devices through intervening private or public networks. Modems, cable modems, Ethernet cards, wireless network adapters and personal area network devices are examples of different types of network adapters 245 that can be used with the processing system 200.

As pictured in FIG. 2, the memory elements 210 can store the security analysis application 110 and the CPUT 120. The security analysis application 110, being implemented in the form of executable program code, can be executed by the processing system 200 and, as such, can be considered part of the processing system 200.

The security analysis application 110 can be executed by the processor 205 to perform the methods and processes described herein. For example, the security analysis application 110 can be executed to analyze the CPUT 120 to identify data pertinent to potential security vulnerabilities of the CPUT, automatically/dynamically synthesize at least one unit test 112, and dynamically process the unit test(s) 112 to communicate one or more test payloads to the CPUT 120 to test for potential security vulnerabilities present in the CPUT 120.

The security analysis application 110 can output the results of such testing to, and store the results within, the memory elements 210. As used herein, "outputting" and/or "output" can mean storing in memory elements 210, for example, writing to one or more files stored in memory elements 210, writing to the display 235 or another peripheral output device, playing audible notifications, sending or transmitting to another system, exporting, or the like. In one embodiment, the security analysis application 100 can be implemented as IBM® Rational® AppScan® Source Edition (IBM, Rational and AppScan are trademarks of International Business Machines Corporation in the United States, other countries, or both).

FIG. 3 is a flow chart illustrating a method 300 of performing security analysis on a CPUT in accordance with another embodiment disclosed within this specification. The method 300 can be implemented by the processing system of FIG. 2.

At step 302, via the processor, the CPUT can be analyzed to identify data pertinent to potential security vulnerabilities of the CPUT. For example, the security analysis application can perform a static analysis of the CPUT. More particularly, security analysis application can analyze program code of the CPUT related to receiving HTTP requests, and analyze program code of the CPUT related to processing HTTP requests.

At step 304, the security analysis application can automatically synthesize one or more unit tests, each unit test being configured to initialize one or more parameters consumed by a particular unit of CPUT program code. For instance, the security analysis application can process the data pertinent to potential security vulnerabilities of the CPUT to synthesize the unit test(s). The security analysis application further can provide to each unit test one or more test payloads configured to test the CPUT for one or more potential security vulnerabilities. As noted, a test payload can comprise one or more values, program code (e.g., script), or the like intended to replicate a malicious payload that an unscrupulous end user may attempt to inject into the CPUT during conventional operation of the CPUT when deployed.

At step 306, the unit test(s) can be dynamically processed to communicate the first payload(s) to the CPUT. For example, the test unit(s) can be dynamically processed to generate one or more artificial HTTP requests, each comprising one or more test payloads, and communicate the artificial HTTP requests comprising the test payloads to the CPUT. In response to receiving the test payload(s), the CPUT can generate one or more HTTP responses and communicate the HTTP responses to security analysis application.

At step 308, the security analysis application can receive from the CPUT the HTTP responses to the artificial HTTP requests. At step 310, the security analysis application can determine whether the test payload(s) exploit actual security vulnerabilities of the CPUT. For example, the security analysis application can analyze the CPUT while processing the test payloads and/or analyze the HTTP response(s) generated by the CPUT, for example as previously described. In illustration, if while processing one or more test payloads the CPUT performs in an undesirable manner, or the CPUT generates undesirable HTTP responses, such behavior of the CPUT can be identified.

At step 312, the security analysis application can analyze the HTTP response(s) to determine whether additional potential security vulnerabilities of the CPUT exist. In illustration, an HTTP response may comprise content that indicates additional data pertinent to potential security vulnerabilities of the CPUT, which may not have been identified at step 302. Referring to decision box 314, if additional potential security vulnerabilities are identified by analyzing the HTTP response(s), at step 316 the additional data can be identified. At step 318, the security analysis application can synthesize one or more additional unit tests. At least one other test payload configured to test the CPUT for at least one potential security vulnerability of the CPUT can be provided to each additional unit test. The process then can proceed to step 306 and continue as described.

Referring again to decision box 314, when no additional potential security vulnerabilities are identified, the process can proceed to step 320 and a security analysis report can be output, for example based on the determinations made at step 310. The results of the security analysis contained in the security analysis report can indicate whether the test payload(s) exploit(s) actual security vulnerabilities of the CPUT. As noted, the results can be output to a display, a printer, stored to memory, or the like.

Like numbers have been used to refer to the same items throughout this specification. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for performing security analysis on a computer program under test (CPUT), the computer program product comprising:
 a computer-readable storage device having computer-readable program code embodied therewith, the computer-readable program code comprising:
 computer-readable program code configured to analyze the CPUT to identify data pertinent to potential security vulnerabilities of the CPUT;
 computer-readable program code configured to automatically synthesize at least a first unit test configured to test a particular unit of program code within the CPUT, the first unit test configured to initialize at least one parameter used by the particular unit of program code within the CPUT;
 computer-readable program code configured to provide to the first unit test at least a first test payload configured to exploit at least one potential security vulnerability of the CPUT;
 computer-readable program code configured to dynamically process the first unit test to communicate the first test payload to the particular unit of program code within the CPUT including computer-readable program code configured to communicate to the CPUT an artificial Hypertext Transfer Protocol (HTTP) request comprising the first test payload;
 computer-readable program code configured to determine whether the first test payload exploits an actual security vulnerability of the CPUT;
 computer-readable program code configured to output a security analysis report indicating whether the first test payload exploits an actual security vulnerability of the CPUT;
 computer-readable program code configured to receive from the CPUT a HTTP response to the artificial HTTP request;
 computer-readable program code configured to analyze the HTTP response to identify additional data pertinent to potential security vulnerabilities of the CPUT;
 computer-readable program code configured to automatically synthesize at least a second unit test, the second unit test comprising at least a second test payload configured to test the CPUT for at least one potential security vulnerability of the CPUT; and
 computer-readable program code configured to dynamically process the second unit test to communicate the second test payload to the CPUT, wherein
 the computer-readable storage device is not a transitory, propagating signal per se.

2. The computer program product of claim 1, wherein the computer-readable program code configured to determine whether the first test payload exploits an actual security vulnerability of the CPUT comprises:
 computer-readable program code configured to analyze processes executed by the CPUT while the CPUT processes the first test payload.

3. The computer program product of claim 1, wherein
 the computer-readable program code configured to determine whether the first test payload exploits an actual security vulnerability of the CPUT comprises computer-readable program code configured to analyze the HTTP response.

4. The computer program product of claim 1, wherein communicating to the CPUT the artificial HTTP request comprises:
 the first unit test automatically generating an artificial HTTP request comprising the first test payload; and
 the first unit test automatically communicating the artificial HTTP request to the CPUT.

5. The computer program product of claim 1, wherein the computer-readable program code configured to automatically synthesize at least the first unit test comprises:
 computer-readable program code configured to process the data pertinent to potential security vulnerabilities of the CPUT to synthesize the first unit test.

6. The computer program product of claim 1, wherein the computer-readable program code configured to analyze the CPUT to identify data pertinent to potential security vulnerabilities of the CPUT comprises:
 computer-readable program code configured to perform a static analysis of the CPUT.

7. The computer program product of claim 6, wherein the computer-readable program code configured to perform the static analysis of the CPUT comprises:
 computer-readable program code configured to analyze program code of the CPUT related to receiving Hypertext Transfer Protocol (HTTP) requests; and
 computer-readable program code configured to analyze program code of the CPUT related to processing HTTP requests.

8. A computer program product for performing security analysis on a computer program under test (CPUT), the computer program product comprising:
a computer-readable storage device having computer-readable program code embodied therewith, the computer-readable program code comprising:
computer-readable program code configured to perform a static analysis of the CPUT to identify data pertinent to potential security vulnerabilities of the CPUT;
computer-readable program code configured to automatically synthesize at least a first unit test configured to test a particular unit of program code within the CPUT, the first unit test configured to initialize at least one parameter used by the particular unit of program code within the CPUT;
computer-readable program code configured to provide to the first unit test at least a first test payload configured to exploit at least one potential security vulnerability of the CPUT;
computer-readable program code configured to dynamically process the first unit test to communicate the first test payload to the particular unit of program code within the CPUT via an artificial Hypertext Transfer Protocol (HTTP) request;
computer-readable program code configured to determine whether the first test payload exploits an actual security vulnerability of the CPUT;
computer-readable program code configured to output a security analysis report indicating whether the first test payload exploits an actual security vulnerability of the CPUT;
receiving from the CPUT a HTTP response to the artificial HTTP request;
analyzing the HTTP response to identify additional data pertinent to potential security vulnerabilities of the CPUT;
automatically synthesizing at least a second unit test, the second unit test comprising at least a second test payload configured to test the CPUT for at least one potential security vulnerability of the CPUT; and
dynamically processing the second unit test to communicate the second test payload to the CPUT, wherein
the computer-readable storage device is not a transitory, propagating signal per se.

9. A system comprising:
a processor configured to initiate executable operations comprising:
analyzing the CPUT to identify data pertinent to potential security vulnerabilities of the CPUT;
automatically synthesizing at least a first unit test configured to test a particular unit of program code within the CPUT, the first unit test configured to initialize at least one parameter used by the particular unit of program code within the CPUT;
providing to the first unit test at least a first test payload configured to exploit at least one potential security vulnerability of the CPUT;
dynamically processing the first unit test to communicate the first test payload to the particular unit of program code within the CPUT by communicating to the CPUT an artificial Hypertext Transfer Protocol (HTTP) request comprising the first test payload;
determining whether the first test payload exploits an actual security vulnerability of the CPUT;
outputting a security analysis report indicating whether the first test payload exploits an actual security vulnerability of the CPUT;
receiving from the CPUT a HTTP response to the artificial HTTP request;
analyzing the HTTP response to identify additional data pertinent to potential security vulnerabilities of the CPUT;
automatically synthesizing at least a second unit test, the second unit test comprising at least a second test payload configured to test the CPUT for at least one potential security vulnerability of the CPUT; and
dynamically processing the second unit test to communicate the second test payload to the CPUT.

10. The system of claim 9, wherein determining whether the first test payload exploits an actual security vulnerability of the CPUT comprises:
analyzing processes executed by the CPUT while the CPUT processes the first test payload.

11. The system of claim 9, the processor further configured to initiate executable operations comprising:
receiving from the CPUT a HTTP response to the artificial HTTP request;
wherein
determining whether the first test payload exploits an actual security vulnerability of the CPUT comprises analyzing the HTTP response.

12. The computer program product of claim 1, wherein the at least a first unit test is automatically synthesized based upon the identified data pertinent to potential security vulnerabilities of the CPUT.

13. The computer program product of claim 8, wherein the at least a first unit test is automatically synthesized based upon the identified data pertinent to potential security vulnerabilities of the CPUT.

* * * * *